United States Patent [19]

Folino

[11] Patent Number: 5,321,988

[45] Date of Patent: Jun. 21, 1994

[54] OSCILLATORY MOTION SPEED CONVERTER HAVING DRIVE AND DRIVEN CAMS WITH BALLS AND RETAINER

[75] Inventor: Frank A. Folino, Weston, Mass.

[73] Assignee: Synkinetics, Inc., Lexington, Mass.

[21] Appl. No.: 51,986

[22] Filed: Apr. 15, 1993

Related U.S. Application Data

[63] Continuation-in-part of Ser. No. 670,263, Mar. 14, 1991.

[51] Int. Cl.$^5$ ............................................. I16H 15/08
[52] U.S. Cl. ......................................... 74/25; 476/36; 475/196
[58] Field of Search ....................... 74/25, 55, 56, 57, ; 475/196; 476/36

[56] References Cited

U.S. PATENT DOCUMENTS

| | | | |
|---|---|---|---|
| 1,568,290 | 1/1926 | Morison | 74/25 |
| 2,512,272 | 6/1950 | Gull | 74/63 |
| 3,039,324 | 6/1962 | Waterfield | 74/63 X |
| 3,049,019 | 8/1962 | Lapointe et al. | 476/36 |
| 3,468,175 | 9/1969 | Rabek | 74/63 |
| 3,807,243 | 4/1974 | Yada | 74/63 |
| 4,584,904 | 4/1986 | Distin, Jr. et al. | 74/63 |
| 4,643,047 | 2/1987 | Distin et al. | 74/63 |
| 4,960,003 | 10/1990 | Hartley | 74/63 |
| 5,016,487 | 5/1991 | Bollmann | 476/36 |

FOREIGN PATENT DOCUMENTS

| | | | |
|---|---|---|---|
| 24020 | 2/1922 | France | |
| 1021945 | 2/1953 | France | |
| 59-133863 | 8/1984 | Japan | |
| 59-180153 | 10/1984 | Japan | |
| 629387 | 9/1978 | U.S.S.R. | |
| 1257331 | 9/1986 | U.S.S.R. | |
| 1368545 | 1/1988 | U.S.S.R. | |
| 1399548 | 5/1988 | U.S.S.R. | 475/196 |
| 1490362 | 6/1989 | U.S.S.R. | |
| 1569470 | 6/1990 | U.S.S.R. | |
| 710543 | 6/1954 | United Kingdom | 74/56 |

OTHER PUBLICATIONS

Abstract, Japan, Patent, 60-179563 (A) Sep. 13, 1985.
Abstract, Japan, Patent, 60-129462 (A) Jul. 10, 1985.
Abstract, Japan, Patent, JP890072449 Mar. 24, 1989.
Mechanical Engineering & Technology Guide, Balls Reduce Speed and Transmitt Torque; publ. prior to Mar. 14, 1991.
Dojen TM Precision Rotary Actuator Designer's Guide, (Div. of Lenze, Woburn, Mass.); publ. prior to Mar. 14, 1991.
Soviet Engineering Research vol. 6 (1986) Feb., No. 2, @pp. 23-26, Mowbray, Leicestershire GB; V. Machinustroeniya,: "Gen'l Info. . . . ".
Abstract, Japan, Patent, 60-146954 (A) Aug. 2, 1985.
Abstract, Japan, Patent, 60-4663 (A) Jan. 11, 1985.

Primary Examiner—Leslie A. Braun
Assistant Examiner—Khoi Q. Ta
Attorney, Agent, or Firm—James E. Maslow

[57] ABSTRACT

Method and apparatus producing oscillatory motion output from a rotary input using balls to interact between input and output cams. Preferred embodiment features a speed reduction stage and an oscillation stage. Dwell periods can be provided as well as indexing to a specific location.

20 Claims, 11 Drawing Sheets

OSCILLATORY MOTION SPEED CONVERTER HAVING DRIVE AND DRIVEN CAMS WITH BALLS AND RETAINER

BACKGROUND OF THE INVENTION

This application is a continuation-in-part of U.S. patent application Ser. No. 670,263, filed Mar. 14, 1991, entitled: SPEED CONVERTER, incorporated herein by reference, and PCT patent application Ser. No. PCT/US92/02023, filed Mar. 13, 1992, entitled: SPEED CONVERTER, incorporated herein by reference.

The present invention relates to mechanical power transmissions, and more particularly, to mechanical conversion of rotary to oscillatory motion.

Speed conversion is an important capability in the efficient utilization of rotary motive force. In practice, the occasion often arises for increasing or decreasing the speed of a drive member input to a higher or lower speed at a driven member output. As well, there are many applications which require conversion of a rotary input to an oscillating output.

In industry, oscillatory motion is employed in robotic assembly, painting, and other situations. In fact, there are many applications in industry Where oscillatory angular movement is required and at such a high rate that stopping a motor and reversing it in the required angular sector is impractical.

One of the most familiar of all oscillatory motion devices is the automotive windshield wiper drive mechanism. Here, a motor, which is continuously rotating in the same direction, drives an oscillation mechanism that outputs an oscillatory motion to the windshield wipers, which are mounted on the oscillator output shaft. The rate of oscillation is controlled by controlling the drive motor speed.

Washing machines are another example of oscillatory motion from a rotary motor, but such devices also must be capable of rotating the washing drum at various speeds. Obtaining this oscillatory motion, as well as drum rotation and speed variation, requires a complex mechanism. Yet for competitive purposes such mechanism must be robust, durable, efficient, low cost and easily serviced.

It is therefore an object of the present invention to provide an oscillatory motion device which is simplified in nature but is efficient and robust in transmission capability.

It is a further object of the present invention to provide an oscillatory motion speed converter which is relatively easy to assemble and service.

It is yet an additional object of the present invention to provide optimized load sharing among the elements that transmit the rotary motive force in an oscillatory device.

It is still an additional object of the present invention to provide means for accommodating wear of the cams and balls of an extended-life oscillatory output speed converter.

SUMMARY OF THE INVENTION

These and other objects are well met by the presently disclosed, highly efficient, oscillatory motion speed converter of the invention. The present invention utilizes appropriately configured face cam tracks, cut into circular disks, interacting with each other through transmitting means, namely balls, which react the rotary motive force while oscillating in slots of a retainer disk fixed to a stationary housing.

In practice of the present invention, angular oscillatory motion is achieved in an arrangement which enables the angular sector to be easily changed by substitution of interchangeable parts. Dwell periods can be introduced either or both at the ends of the angular sector and at points in between. As well, it is possible to output a number of angular oscillations and to dwell for a period of time before repeating the same number of oscillations.

In one aspect of the invention apparatus for converting a rotary motion input to an oscillatory motion output is provided having driven cam means for oscillating an output device, means for retaining at least one interacting element in a slot of the retainer means, and drive cam means for driving said driven track means via said at least one interacting element guided in said slot.

Embodiments of the invention have various features, such as wherein the driven cam means has a driven cam disk and a driven cam track defined on a face thereof and the drive cam means has a drive cam disk and a drive cam track defined on a face of the drive cam disk; wherein the interacting elements are balls and the retaining means is a slotted reaction disk; wherein the driven cam track has a plurality of discontinuous segments; wherein a respective ball is associated with a respective one of the discontinuous segments; wherein a housing is provided in which a first of the track means is slideably mounted over a shaft axis and the other track means is relatively unslideable over the axis relative to the housing; wherein compression springs and axially preloading external adjusting screws are provided which compress the springs between an inner wall of the housing and a backface of one of the cam means via a thrust bearing; wherein the drive cam track and driven cam track each have an angled flank for one-point interaction with the interacting elements; wherein the drive cam track is a single continuous track of segments, each segment having its own profile; wherein ones of the segments have the same profile; wherein others of the segments have a uniform radius for defining a respective dwell period; and wherein ones of the segments have a non-uniform radius for defining a respective oscillation period.

Preferably the cam means of the apparatus together form a conjugate pair of devices rotatable about a common axis, a first device of the pair being an input device for supply of angular velocity and rotary motive force and a second device of the pair being an oscillating output device. The means for retaining and the interacting elements are means for transmitting angular velocity and rotary motive force of the input device to oscillatory angular velocity and rotary motive force of the output device as the interacting elements are put in motion by the input device. The input device cooperates with the in-motion interacting elements and the output device for transmitting, through all the in-motion interacting elements, the angular velocity and rotary motive force of the input device to angular velocity and rotary motive force of the oscillating output device. In a specialized case, the transmitting through all the in-motion interacting elements is done substantially equally and simultaneously through all the in-motion interacting elements.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF PREFERRED EMBODIMENTS

Figure 1:
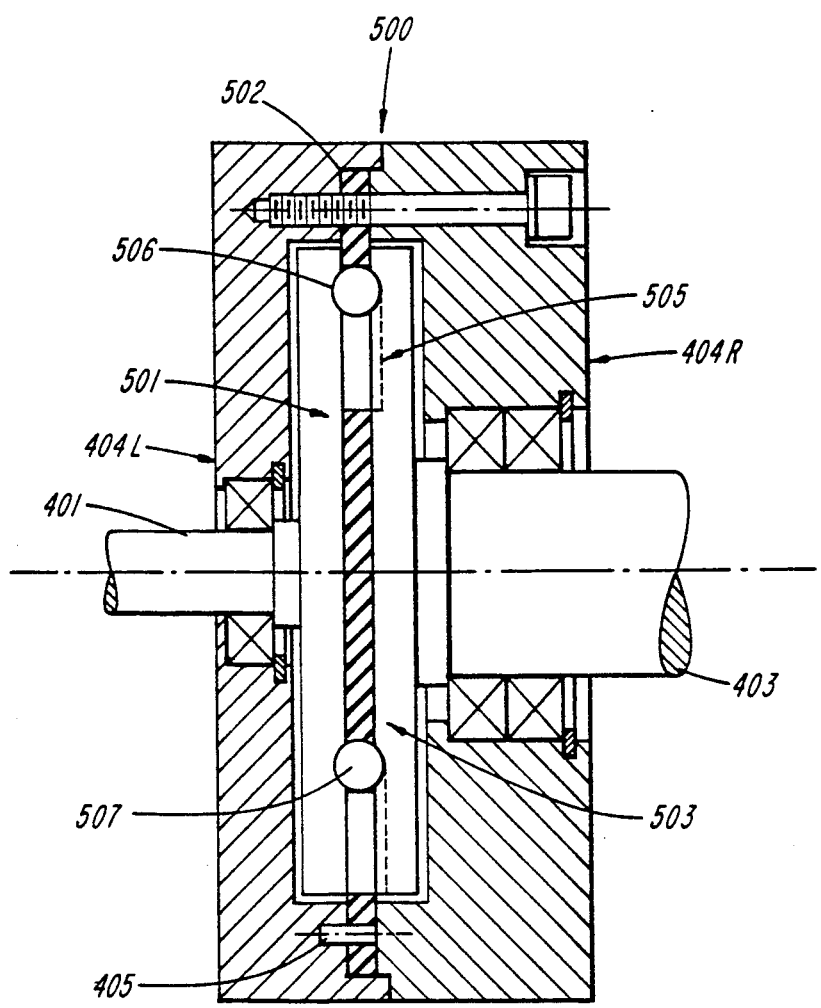
FIG. 1 is a side cross-sectional view of an oscillatory drive embodiment of the invention having a continuous rotary input and an oscillatory angular motion output.

Referring to FIGS 1-5, assembly 500 of the invention is shown having input drive shaft 401 coupled to a circular-disk drive cam 501. A drive cam track 506 is defined on the drive face of cam 501. Output shaft 403 is coupled to circular driven cam 503. A driven cam track 505 is defined on the driven face of cam 503. A reaction disk 502 between cams 501 and 503 is fixed by pin 405 to the housing. (The housing is shown ill FIG. 1 having left and right mating portions 404L and 404R.)

The drive and driven cams 501/503 interact at their cam tracks via at least one ball 507. Reaction disk 502 is configured with a respective slot 508 to accommodate a respective interacting element (e.g., a ball) 507 as the latter oscillate radially inwardly and outwardly.

Figure 2:
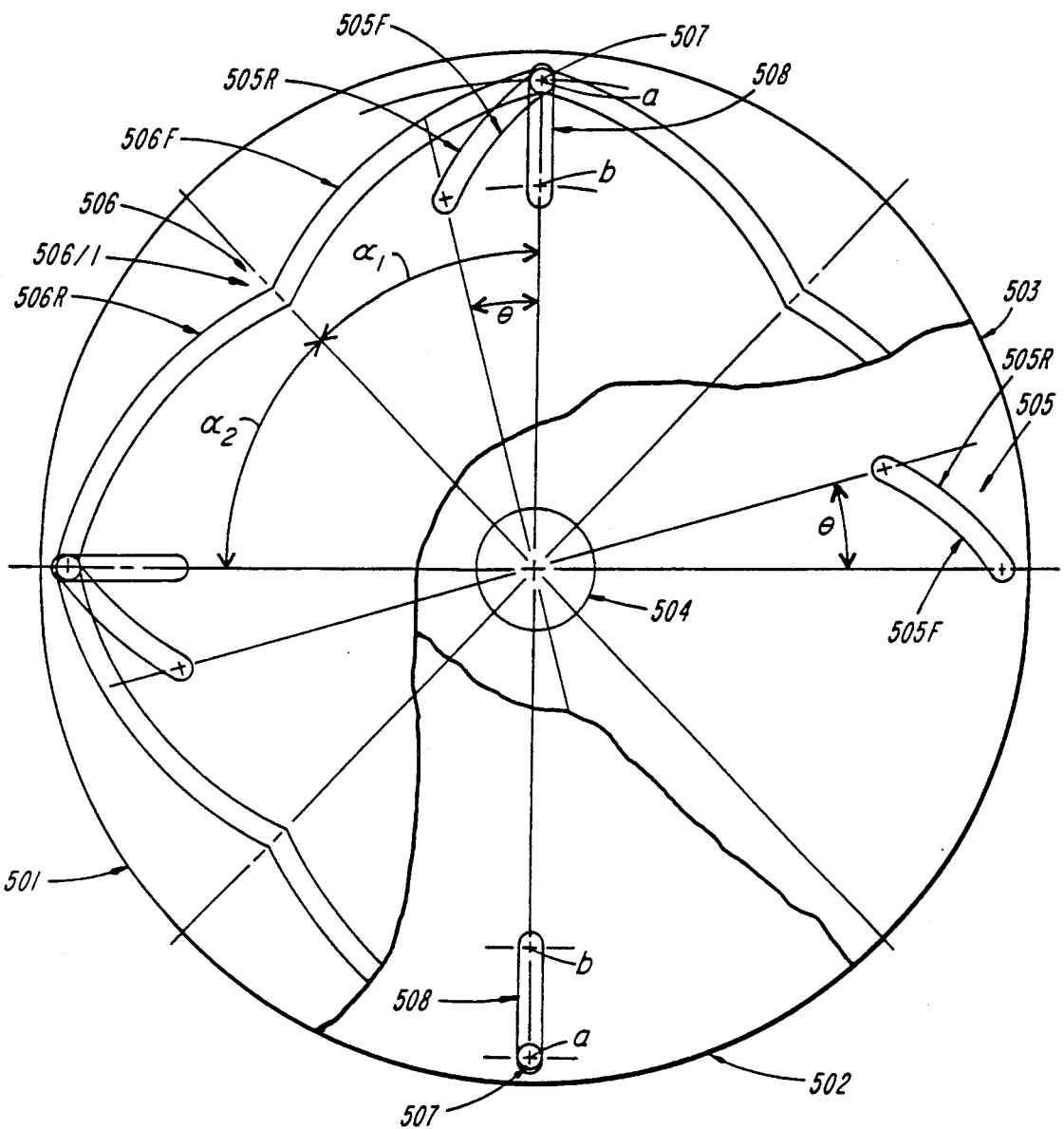
FIG. 2 is a cutaway view of the drive cam track, slotted retainer, and driven cam track superimposed over each other, giving all overview of the elements of FIG. 1.
Figure 3:
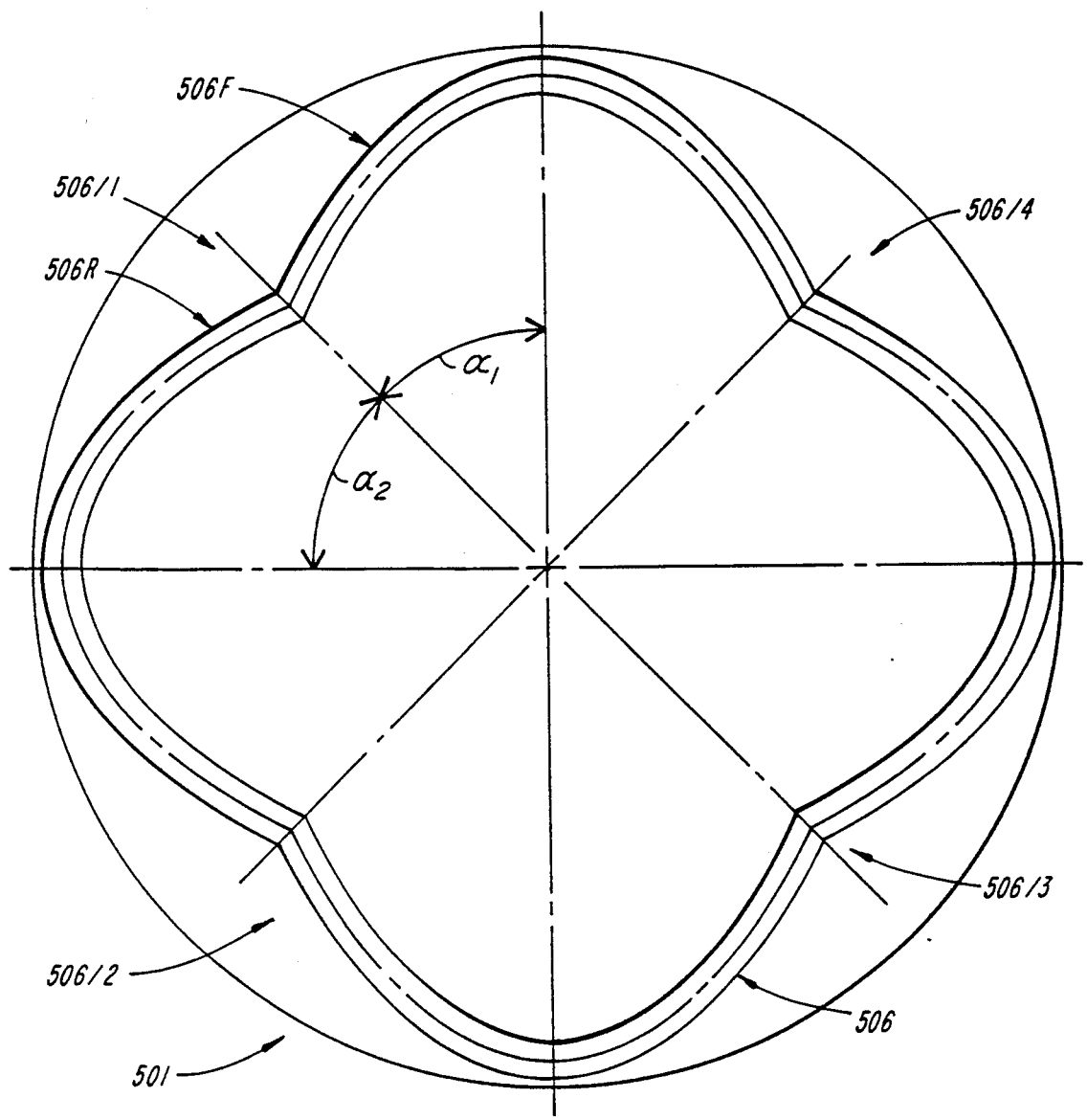
FIG. 3 is a front view of the drive cam track configuration for the oscillatory angular motion drive of FIGS. 1 and 2.

FIG. 2 illustrates, but is not limited to, the configuration of a conjugate pair of angular sector input/output cams capable of continuously oscillating at the output for a continuously rotating input. The drive cam 501, reaction disk 502 and driven cam 503 produce, when interacting with a continuously rotating input of the drive cam 501, an oscillatory motion of the driven cam 503 and of the driven cam output axis 504, through an angular sector $\theta$.

The face of drive cam 501 (FIG. 3) defines a drive cam track 506, which in this embodiment includes four cycles, 506/1, 506/2, 506/3 and 506/4. Each drive cam track cycle has a fall segment 506F and a rise segment 506R. The face of the driven cam 503 (FIG. 4) defines a driven cam track 505 formed of four discontinuous track cycles 505/1, 505/2, 505/3, and 505/4; each driven cam track cycle has a fall flank 505F and a rise flank 505R.

The continuous drive cam track 506 and the discontinuous driven cam track 505 are conjugate, and their interaction through the balls 507 allows the balls to travel along the loci a–b (i.e. along the centerline of the slots 508 of the reaction disk 502 ( FIG. 5 )).

The same activity simultaneously occurs at all such drive cam track cycles and driven cam track cycles. For ease of explanation, reference is now made to drive cam track cycle 506/1 interacting with the driven cam track cycle 505/1.

As shown in FIG. 2, as the drive cam 501 rotates in a clockwise direction, the fall segment 506F of the drive cam track cycle 506/1 interacts through ball 507 with the fall flank 505F of the driven cam track cycle 505/1. This interaction produces a torque that rotates the driven cam 503, and its output axis 504, in a counterclockwise direction through an angle $\theta$, for the input angle $\alpha_1$ of the drive cam 501. As the drive cam 501 continues to rotate in the clockwise direction through the angle $\alpha_2$, the rise segment 506R of the drive cam track cycle 506/1 interacts with the rise flank 505R of the driven cam track cycle 505/1. This interaction produces a torque that rotates the driven cam 503, and its output axis 504, in a counterclockwise direction through another equal angle $\theta$, for the input drive angle $\alpha_2$, where angle $\alpha_1$ is equal to $\alpha_2$.

The driven cam 503 and its output axis are now back to their original angular position ready for the next oscillation of $\theta$ degrees, and the drive cam 501 and the input axis have rotated through angle $\alpha_1$ plus $\alpha_2$, i.e., the angular displacement associated with the drive cycles. The drive cam's four simultaneously driving and equal cam cycles produces four oscillations of $\theta$ degrees for each complete revolution of the drive cam 501.

The driven cam 503, has four cams 505 that are equally spaced and as shown interact with four balls 507 in the reaction disk slots 508. This configuration transmits the torque through the four balls simultaneously and thereby the balls share the load equally among themselves.

Figure 6:
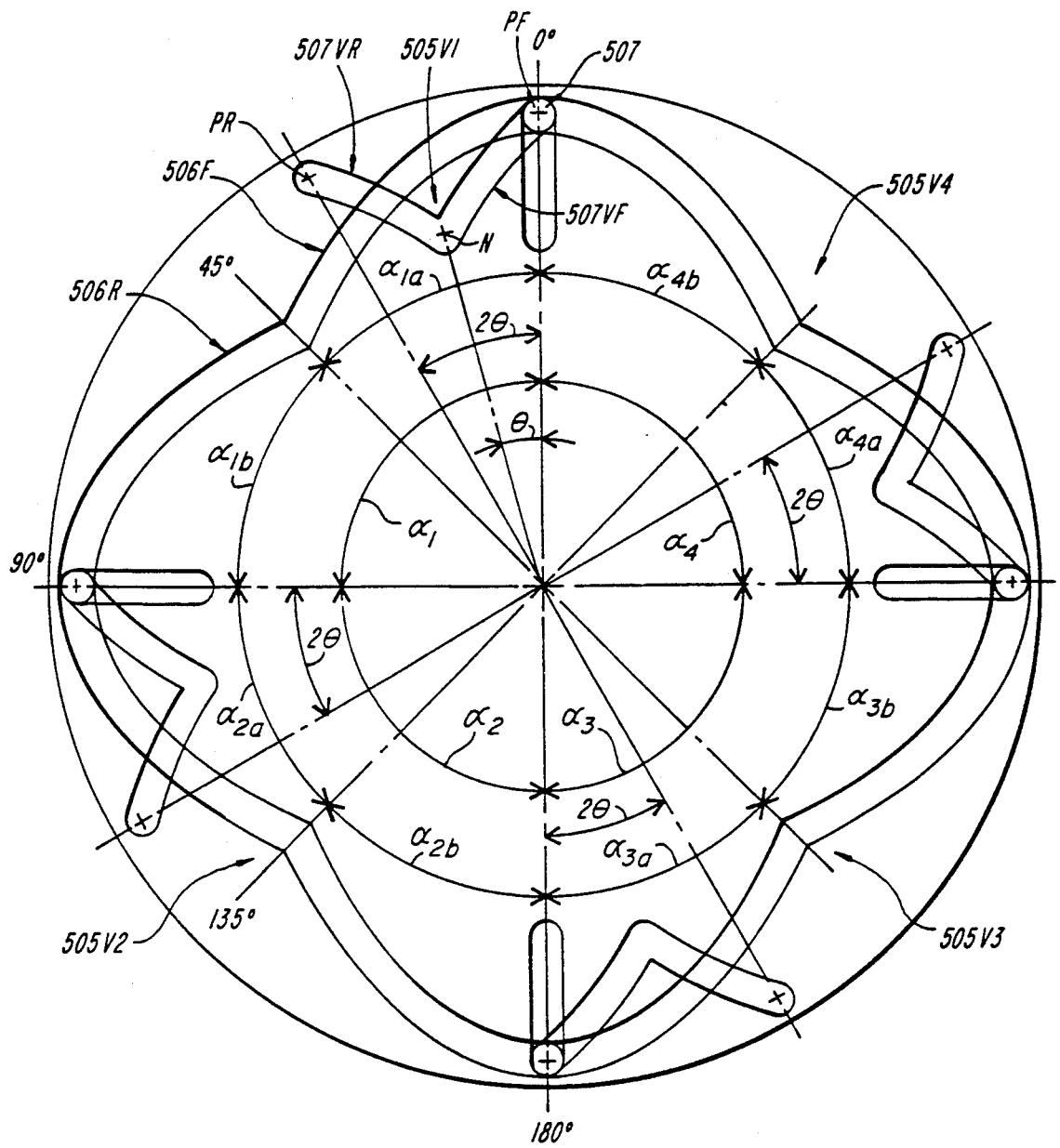
FIG. 6 shows the drive cam track, slotted retainer, and driven cam track superimposed over each other, in an embodiment wherein the oscillatory angle is increased to $2\theta$ to double the oscillatory angular sector travel.

It will be understood that many combinations of angular travel and cycles are possible, as well as varying the balls/slots. Also, the oscillatory angle can be varied, larger or smaller. In the embodiment of FIG. 6, the same drive cam track, having four cycles represented by the 90 degree angular sectors $\alpha_1$, $\alpha_2$, $\alpha_3$, and $\alpha_4$, as in FIG. 2, is interacted via balls 507 with V-shaped discontinuous driven cam track cycles 505v/1, 505v/2, 505v/3, and 505v/4. Each of these V-shaped cycles has a fall segment 505vF and a rise segment 505vR, which interact with an adjacent fall segment 506F or rise segment 506R of the drive cam track 506 via a respective ball.

Referring to V-shaped segment 505v/1 and ball 507 at the peak PF of the fall segment 505vF at zero degrees, as in FIG. 6, the drive cam track cycle fall segment 506F interacts via ball 507 from 0 to 45 degrees of drive cam rotation ($\alpha_{1a}$) until the ball hits the bottom point N of the "V", thus displacing the driven cam by $\theta$ degrees, counterclockwise. Now the drive cam track cycle rise segment 506R drives the ball from 45 to 90 degrees of rotation (over angle $\alpha_{1b}$) to the peak PR of the driven cycle rise segment 505vR, for an additional $\theta$ degrees of counterclockwise rotation at the output. This completes the first 90 degrees of input rotation, for the same angle $\alpha_1$ of FIG. 2 but unlike the embodiment of FIG. 2 the driven cam has been rotated counterclockwise $2\theta$. Therefore over the next drive cycle of rotation, i.e., from 90 to 180 degrees, sector $\alpha_2$, the ball is reversed in its travel in the V-shaped driven track which returns the output clockwise $2\theta$ degrees back to the oscillation starting point.

Thus the $\theta$ degrees of oscillation associated with the fall segment 505vF of the V-shaped driven cam track cycle and the $\theta$ degrees of oscillation associated with the rise segment 505vR of the V-shaped driven cam track cycle combine to obtain a total angular oscillation of $2\theta$ for each cycle 506/1-506/4 of the drive cams track 506. This is twice the angular displacement at the driven output of FIG. 2. As shown in FIG. 6, the same drive cam of FIG. 2 will now rotate the angle $\Delta_1$ plus $\Delta_2$, which is twice the angular rotation demonstrated in FIG. 2. Accordingly, continuous rotation of the drive cam will produce an oscillatory angular movement equal to $2\theta$, and will require an angular rotation of $\alpha_1$ plus $\alpha_2$ to complete one oscillation. A second oscillation will be completed by the angles $\alpha_3$ plus $\alpha_4$, which completes one revolution of the drive cam. In this example, two oscillations at twice the angle are completed as compared to four oscillations at half the oscillatory angle of FIG. 2.

The cams of the invention can be mixed and matched to obtain various desired results. This interchangeability feature is demonstrated here, in that the same drive cam is used in both drives. It can be seen that other oscillatory angles are possible with the same drive cam, as obtained by utilizing driven cam configurations with smaller angles or different numbers of cycles. For example, if the driven cam had two cycles instead of one as shown in FIG. 6, the oscillatory angle would be four times the angle $\theta$ of FIG. 2 and would require one complete revolution of the same driven cam.

Figure 7:
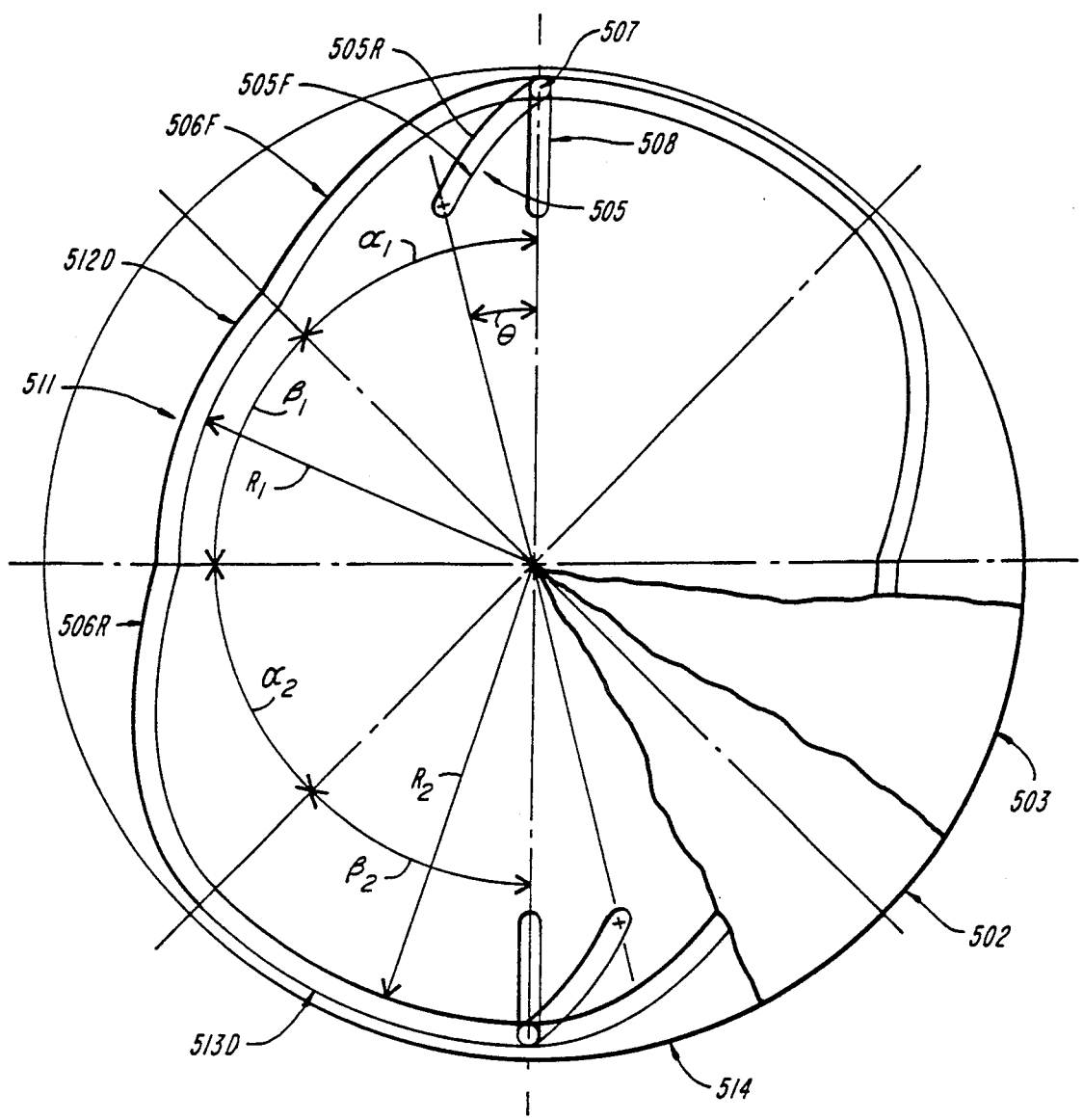
FIG. 7 is a cutaway view of the drive cam track, slotted retainer, and driven cam track superimposed over each other, in an embodiment which outputs an oscillatory angular motion with a dwell period at each end of the angular sector travel.

Along with the reversing feature discussed above, as is basic to oscillatory motion, it is also possible to include dwell periods that will hold the position of the driven cam and the associated output axis for a period of time. One example, is shown in FIG. 7 and includes dwell periods at the extremes of the oscillatory angle $\theta$, although dwells at intermediate locations are also possible.

Figure 4:
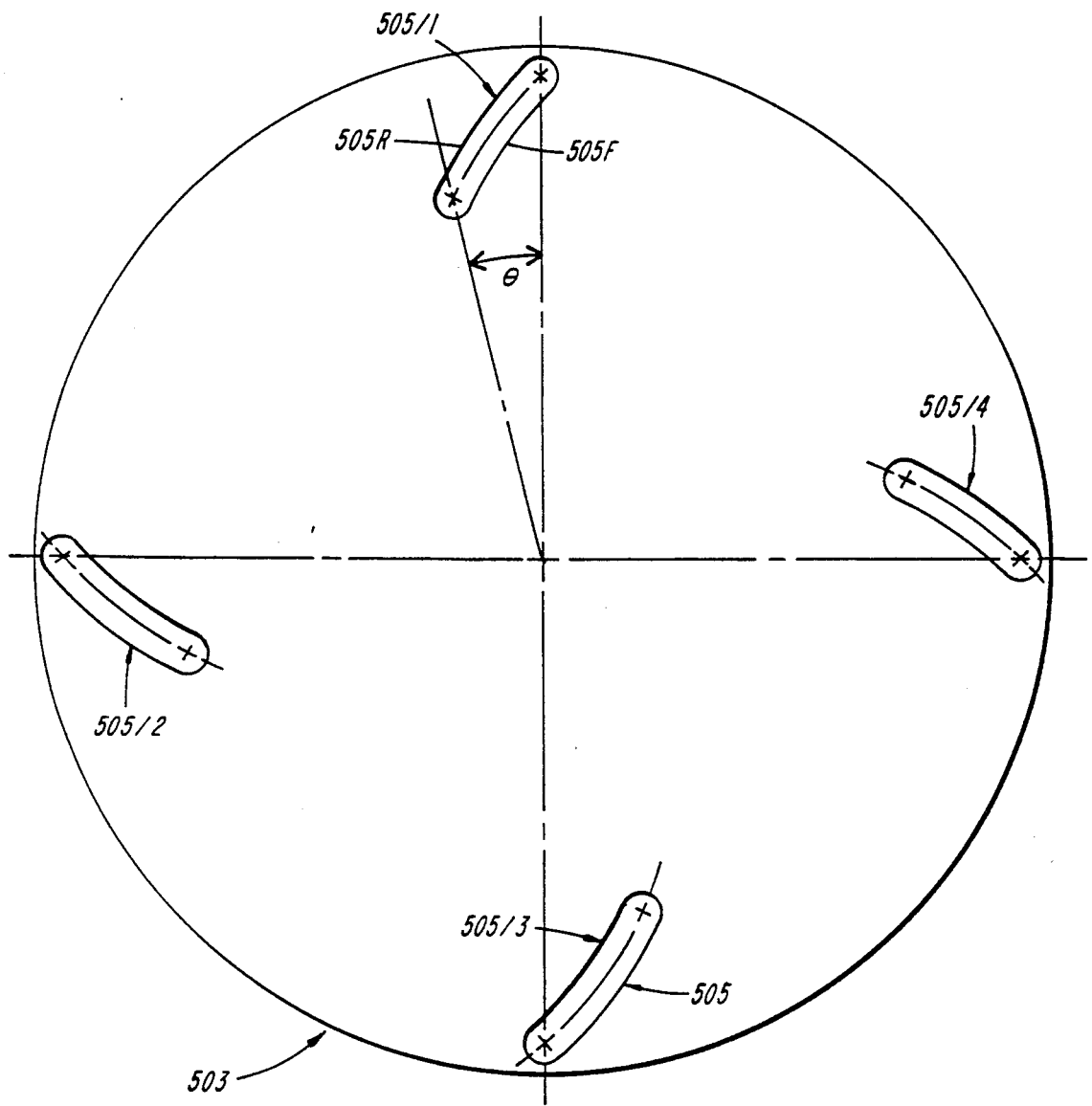
FIG. 4 is a front view of the driven cam track configuration for the oscillatory angular motion drive of FIGS. 1 and 2, and, as shown, will output an angular sector of $\theta$ degrees.
Figure 5:
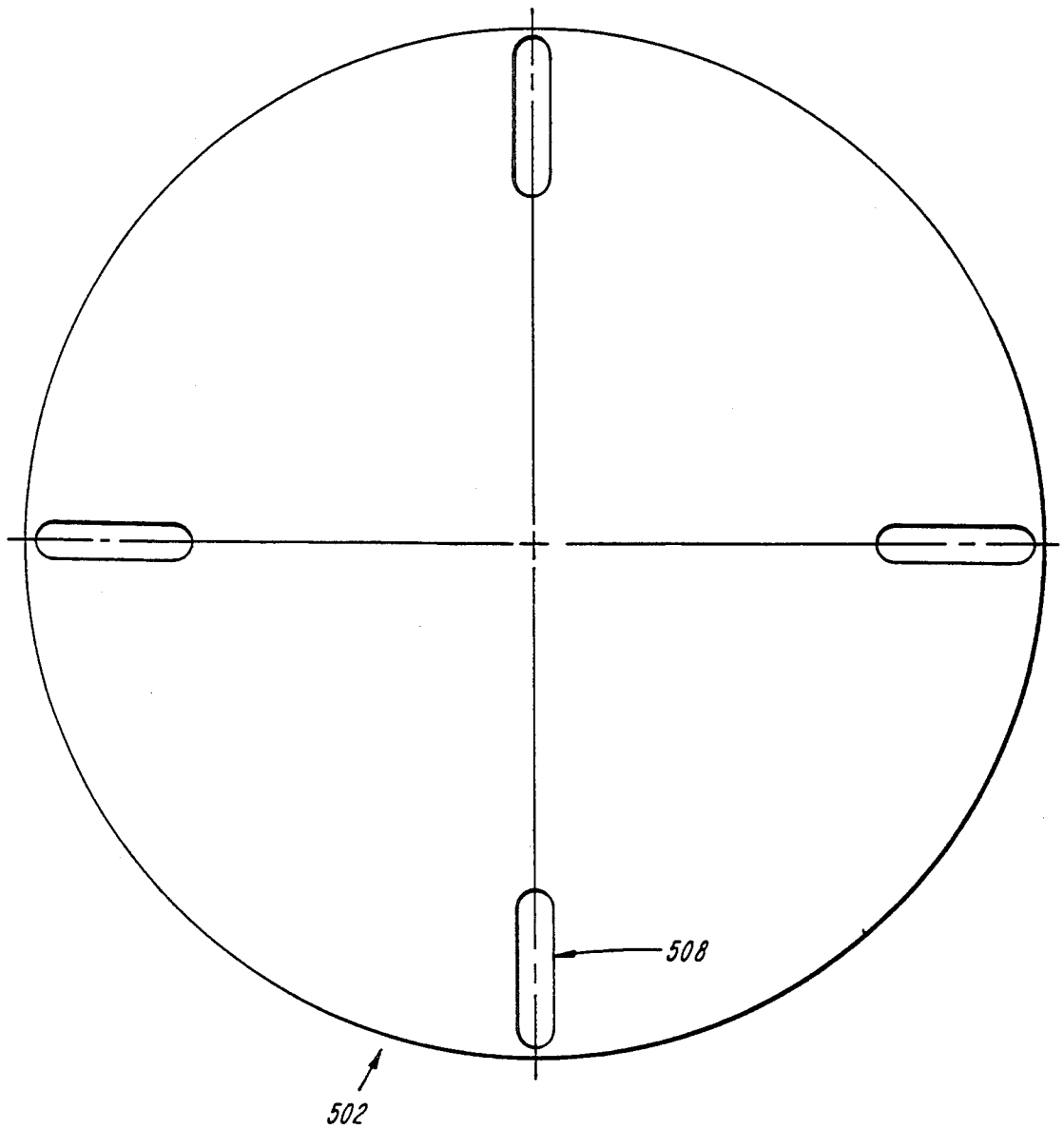
FIG. 5 is a front view of the reaction disk with the slot configuration for the oscillatory angular motion drive of FIGS. 1 and 2.

FIG. 4 shows the driven cam 503 and its four driven cam tracks 505 and FIG. 5 shows a reaction disk 502 and its four slots 508. Utilizing a drive cam 514 having a drive cam track 511, shown in FIG. 7, with the same reaction disk 502 and driven cam 503 of FIGS. 4-5, dwell periods equal in time for the angle $\beta_1$ and $\beta_2$ occur. The counterclockwise output, angular displacement $\theta$ at the driven cam 503, is obtained in the arrangement of FIG. 7 as a result of the interaction of the drive fall cycle 506F and the driven fall cycle 505F for clockwise rotation of the drive cam track 511 through the angle $\alpha_1$.

As the drive cam 514 continues its rotation, cam track segment 512D interacts with ball 507, slot 508 and the driven cam track 505. But since the cam curvature of 512D is a constant radius the ball will remain fixed at radius R1 for the angle $\beta_1$ and in turn the driven cam 503 and output axis will not rotate for the time period mapped by angle $\beta_1$. With the drive cam still rotating clockwise and at the conclusion of this $\beta_1$ dwell interaction, the drive cam track segment 506R interacts with the driven cam track segment rise flank 505R through angle $\alpha_2$ and produces a torque that drives the driven cam 503 and the output axis in a clockwise direction through the a reversed angular displacement $\theta$, whereby the driven cam 503 returns back to its original position.

The drive cam now enters a second dwell period, while maintaining a constant output position, over angle $\beta_2$. This is accomplished by the interaction of the drive cam track segment 513D which has a constant radius R2.

In this illustration, $\alpha_1$ and $\alpha_2$ are equal, and $\beta_1$ and $\beta_2$ are equal. This provides an oscillatory motion equal to the angular sector $\theta$ with equal dwell periods at each extremity. The process is repeated for the second half of the drive cam so that a second oscillatory cycle is completed for one complete revolution of the drive cam. In this mechanism, two balls 507 and two slots 508 of the four in FIG. I are used.

Figure 8:
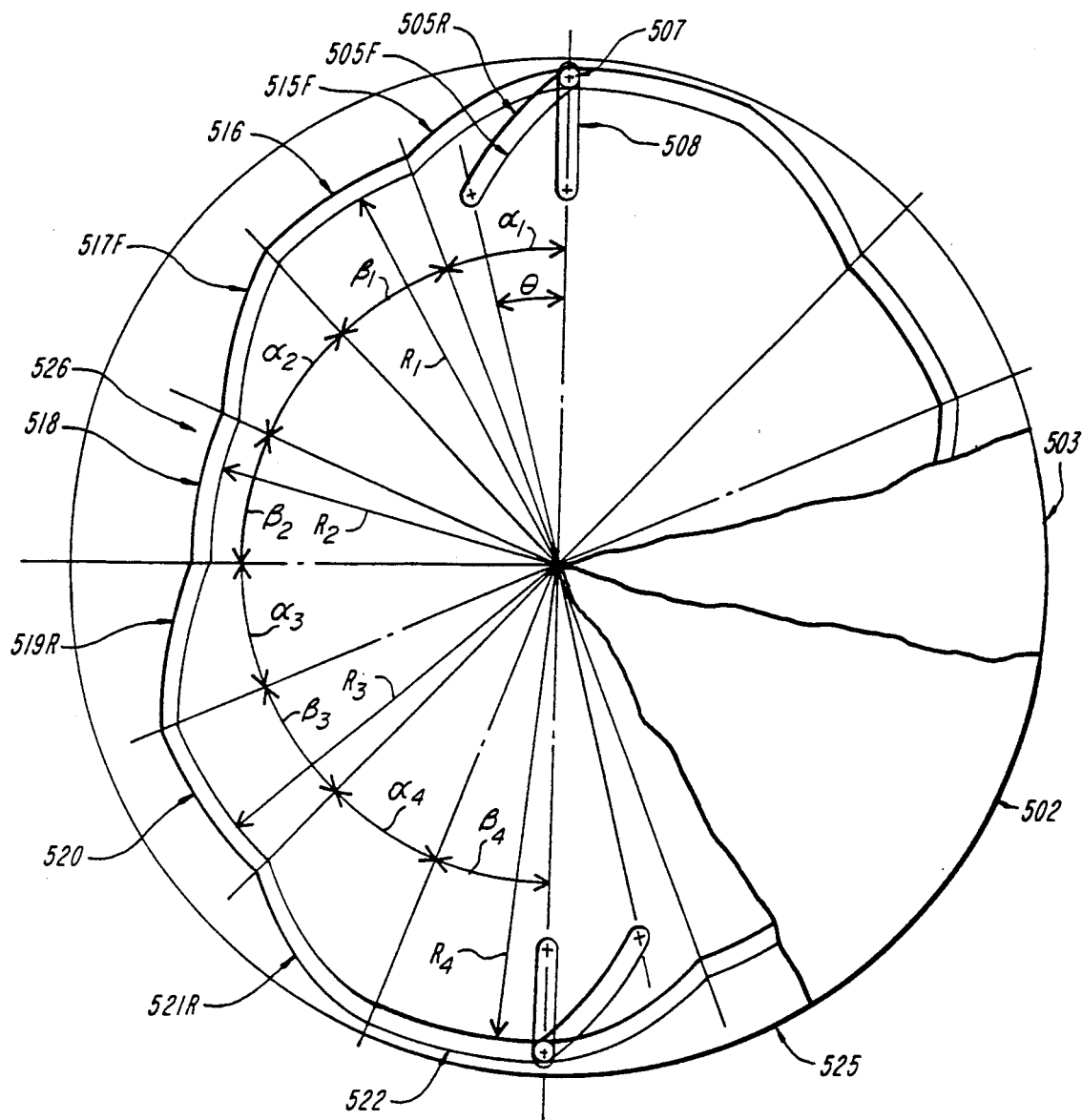
FIG. 8 is a cutaway view of the drive cam track, slotted retainer, and driven cam track superimposed over each other, in an embodiment which outputs an oscillatory angular motion with a dwell period at each end of the angular sector travel and also at its mid-point.

A variation of the oscillatory motion and dwell features described above is the ability to index (at a selected angular location) and dwell (for a selected time period) within the oscillatory angle. FIG. 8 illustrates one such drive cam configuration, in which oscillatory angle $\theta$, similar to that achieved with the driven cam in FIG. 2 (but here with two slots 528 in disk 529 and two balls 507), provides for indexing and dwell for the angle $\theta$ at the extremities and at the center of angle $\theta$.

Thus it will be appreciated that continuous rotation of drive cam 525 and its drive cam track 526 produces a series of desired oscillations and dwells at the driven output. First, the drive cam track fall segment 515F of drive cam track 526 interacts with fall flank 505F of driven cam track 505 of driven cam 503 for a counterclockwise angular displacement angle equal to $\theta/2$. Then cam track segment 516 of drive cam track 526 at constant radius R1 produces a dwell that is equal in time to angle $\beta_1$. Next, the drive cam track fall segment 517F interacts with fall segment 505F of driven cam 503 for completion of oscillatory angle $\theta$ in the counterclockwise direction.

Now cam track segment 518 of drive cam track 526 at constant radius R2 produces a dwell at $\theta$ which is equal in time to angle $\beta_2$. Drive cam track rise segment 519R of drive cam track 526 interacts with cam track 505R of driven cam and reverses direction of the driven cam with an angular displacement of $\theta/2$ in a clockwise direction. Cam track segment 520 of drive cam track 526 at radius R3, which is equal to R1 in this case, produces a dwell at the $\theta/2$ counterclockwise position and is equal in time to $\beta_3$. Cam track segment 521R of drive cam track 526 interacts with cam track segment 505R for completion of oscillatory angle $\theta$, clockwise, returning the oscillating output to its starting point. Cam track segment 522 of drive cam track 526 at radius R4 produces a dwell at completion of angle $\theta$, and is equal in time to the angle $\beta$.

The drive cam 503 and output axis, now back to their original position, and ready for the next cycle, which will be accomplished with the second half of the rotating drive cam track 526. The configuration of this mechanism will provide two cycles of indexing and dwelling at the extremes and center of the oscillatory angle $\theta$. The same type of driven cam and reaction disk are utilized as in FIG. 1 and FIG. 2, but utilizing two balls and slots.

Figure 9A:
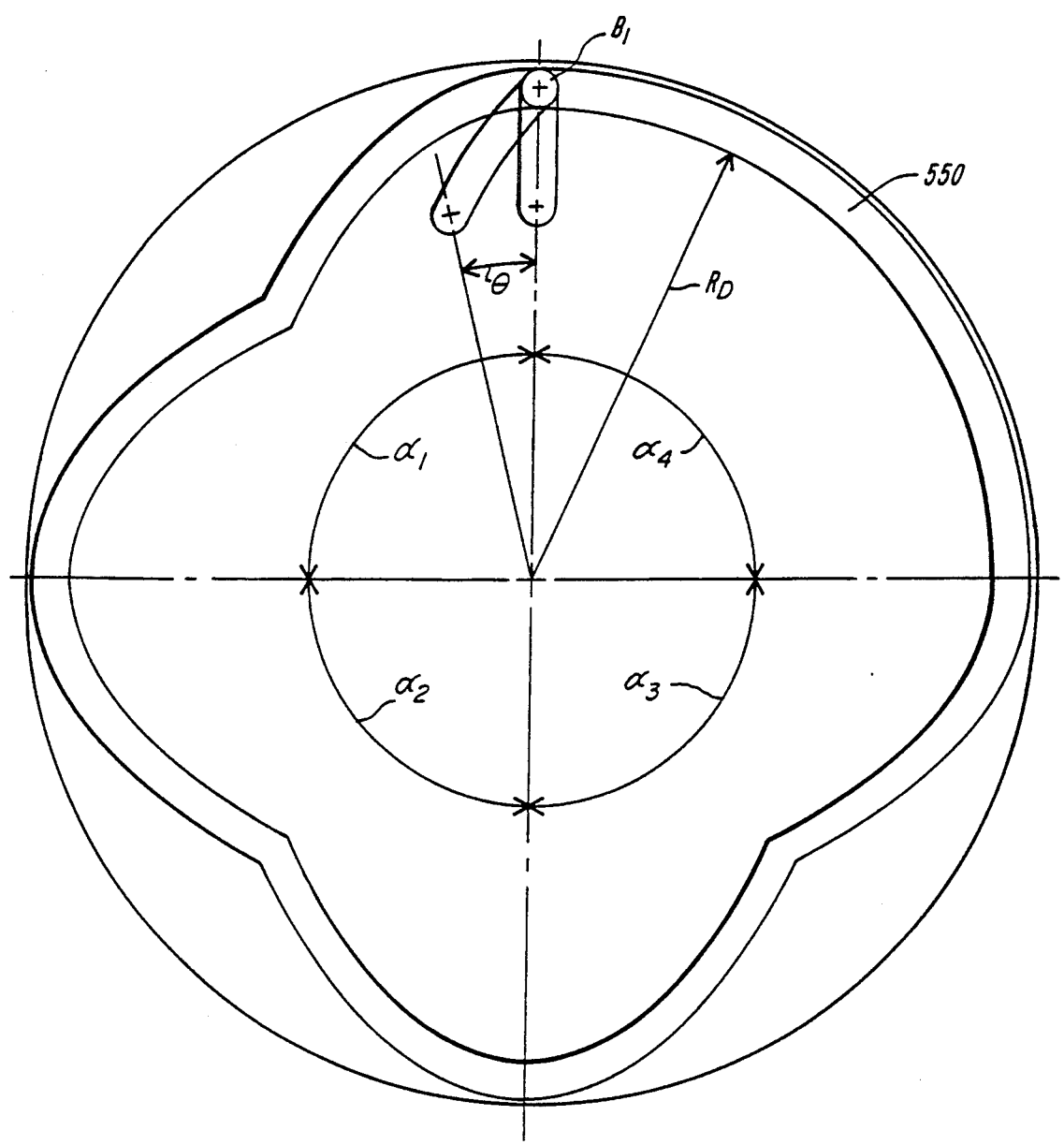
FIG. 9(A,B) shows the drive cam track, slotted retainer, and driven cam track superimposed over each other, in an embodiment that outputs three oscillatory cycles of the output shaft and then has a dwell period.

A further variation of the invention involves the outputting of one or more angular oscillations and then having a dwell period. FIG. 9(A) shows the driven cam of FIG. 2 with an oscillation angle of $\theta$. The angular sectors $\alpha_1$, $\alpha_2$ and $\alpha_3$ are defined having a non-uniform radius and produce three oscillatory cycles at the output, followed by a constant radius angular sector $\alpha_4$, which does not drive the output.

Thus angles $\alpha_1$ through $\alpha_4$ total 360 degrees of rotation of the drive cam, and are translated into three oscillatory cycles and one dwell period. Each oscillatory cycle is defined by the travel of the output shaft over an angular sector of $\theta$ degrees in one direction, and then a return of $\theta$ degrees in the opposite direction, for each of angles $\alpha_1$ through $\alpha_3$. Each dwell is possible because the track 550 over angle $\alpha_4$ is defined by a constant radius $R_D$ which holds the drive ball B1 in place, and thus without radial displacement the driven cam remains stationary and the output axis does not rotate.

Figure 9B:
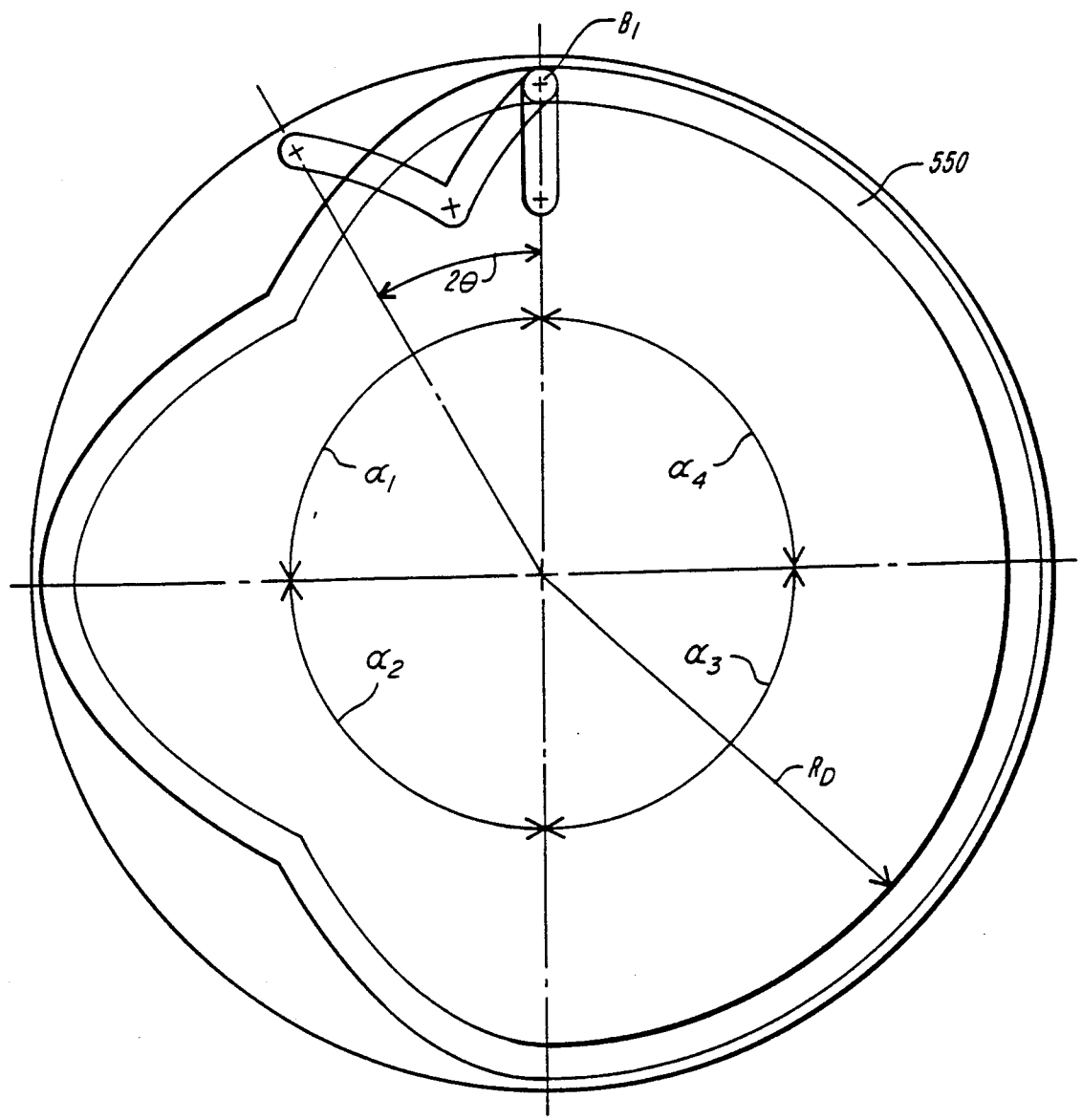

Using the driven cam of FIG. 6 with an oscillatory angle of $2\theta$, one oscillatory cycle is completed within angles $\alpha_1$ plus $\alpha_2$, as is shown in FIG. 9B. Track 550 with radius $R_D$ now produces a dwell for angles $\alpha_3$ plus $\alpha_4$, after completion of the oscillatory angle $2\theta$. In this case, for one revolution of the drive cam, an oscillation with an angle $2\theta$ occurs and then a dwell period of equal duration in time occurs.

Figure 10:
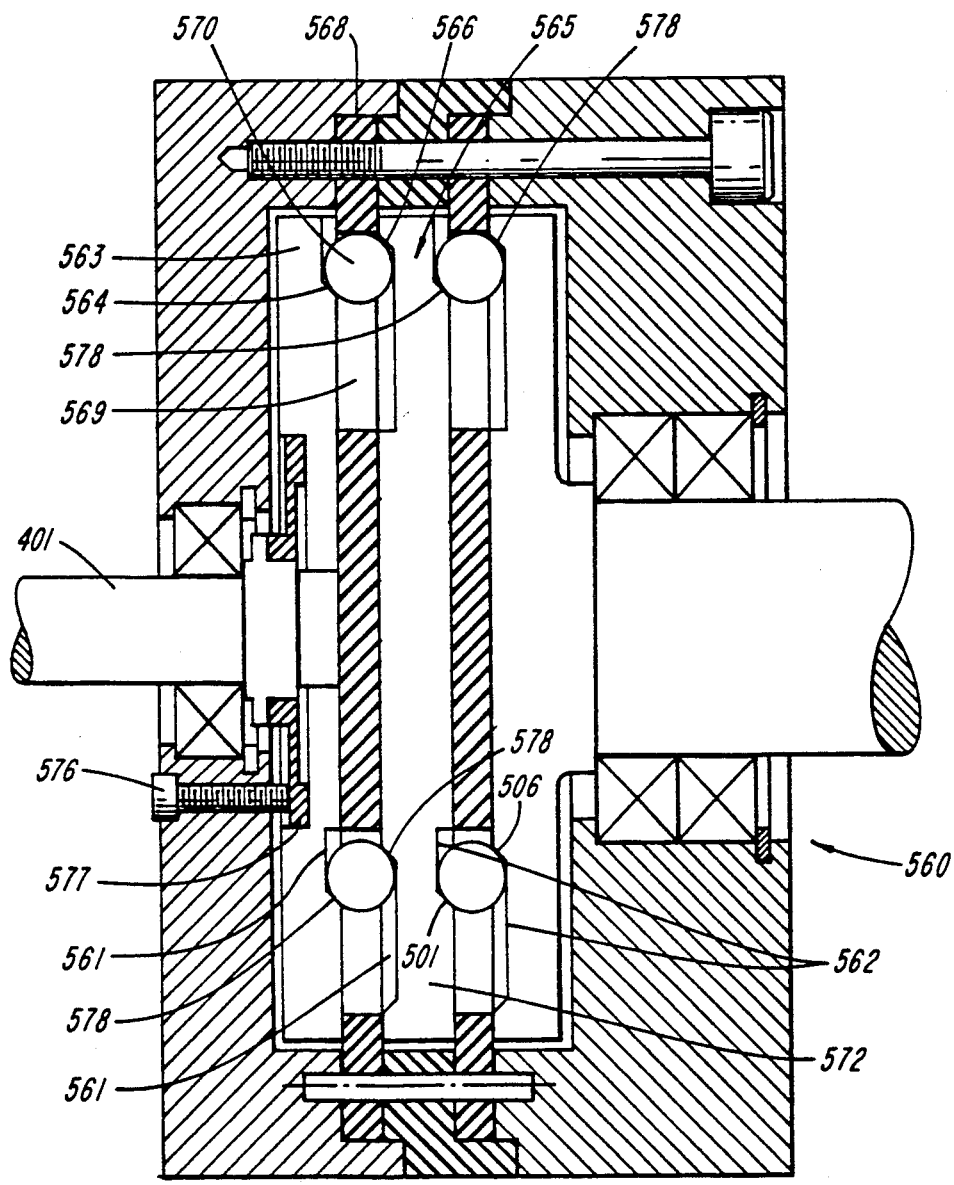
FIG. 10 is a side cross-sectional view of an oscillatory drive embodiment of the invention having a speed converter stage for receiving and converting the rotary input and an oscillation stage driven by the output of the speed converter stage.

A further embodiment of the invention 560 is shown in FIG. 10. Assembly 560 has a speed conversion (increaser or reducer) stage 561 for receiving and converting the rotary input from shaft 401 and an oscillation stage 562 driven by the output of the speed conversion stage.

The speed converter has a conjugate pair of input/output cams 563, 565, rotatable about the common shaft axis, and translating means for transmitting the angular velocity and rotary motive force applied to drive cam 563 (having a drive cam track 564) to angular velocity and rotary motive force of the driven output cam 565 (having a driven cam track 566). The translating means includes a reaction disk 568 having at least one slot 569 for oscillation of an interacting element 570 in the slot, the retainer being located between the conjugate pair about the common axis, wherein the interacting element couples the first device to the second device. Accordingly, for any input, the output will rotate at the converted output speed according to the ratio of input cam cycles to output cam cycles.

Further details of this speed conversion stage are set forth in copending and commonly owned U.S. patent application Ser. No. 670,263, filed Mar. 14, 1991, entitled: SPEED CONVERTER, incorporated herein by reference, and copending and commonly owned PCT patent application Ser. No. PCT/US92/02023, filed Mar. 13, 1992, entitled: SPEED CONVERTER, incorporated herein by reference.

The first stage 561 (speed converter) output cam track 566 is formed as one side of two-sided disk 572. The reverse side of disk 572 forms the drive cam 501 and drive cam track 506 of the second stage 562. The second stage comprises an oscillatory device such as shown in FIG. 1. In this manner, speed conversion and oscillatory motion can be combined in a simply made and simply defined device.

The embodiment of FIG. 10 is also a zero backlash configuration, and is provided with a spring arrangement with axially preloading external adjusting screws 576 which compress springs 577 between an inner wall of the housing and a backface of the adjacent cam disk. Furthermore, the drive cam track and the driven cam track each have angled flanks, e.g., 578, for one-point interaction with the interposed balls. The housing is comported such that a first of the cam disks is slideably mounted over the shaft axis and the other the cam disk is relatively unslideable over the axis relative to the housing. This embodiment is a special adaptation copending and commonly owned U.S. patent application Ser. No. 08/016,506 filed Feb. 11, 1993, entitled: SPEED CONVERTER WITH ZERO BACKLASH, incorporated herein by reference.

It will be understood that the above description pertains to only several embodiments of the present invention. That is, the description is provided by way of illustration and not by way of limitation. For example, there are many variations of consecutive oscillatory cycles followed by dwell periods of equal or unequal time periods, as is possible in practice of the present invention. As well, in various of the foregoing embodiments, one, two or four balls/slots were employed, although additional balls/slots may be employed. It will be further appreciated that by varying the angles $\alpha$, $\beta$, and $\theta$, many combinations of oscillating cams and varying amounts of time cycles and dwells are possible. The benefits, features and advantages of the face cam embodiments of the invention set forth above can also be practiced in a cylindrical configuration, with axial rather than radial slots. The invention is further characterized according to the following claims.

What is claimed is:

1. Apparatus for converting a rotary motion input to an oscillatory motion output, comprising
    driven cam means for oscillating an output device, said means comprising at least one finite-segment driven cam track,
    retaining means having at least one radial slot,
    at least one interacting element for travel in said radial slot, and
    drive cam means having a cam track for oscillatorily driving said finite-segment driven cam track via said at least one interacting element traveling in said radial slot.

2. The apparatus of claim 1 wherein said driven cam means comprises a driven cam disk and a driven cam track defined on a face of said driven cam disk.

3. The apparatus of claim 1 wherein said drive cam means comprises a drive cam disk and a drive cam track defined on a face of said drive cam disk.

4. The apparatus of claim 1 further comprising a device housing defining a longitudinal axis, and in which said cam means are mounted concentrically to said axis, wherein said interacting elements are balls and said retaining means is a slotted reaction disk for non-rotatable and concentric mounting relative to said axis.

5. The apparatus of claim 2 wherein said driven cam track is comprised of a plurality of discontinuous segments.

6. The apparatus of claim 5 wherein said interacting elements are balls and said retaining means is a slotted reaction disk, wherein a respective said ball is loaded in a respective one of said slots, and wherein a respective ball is associated with a respective one of said plurality of discontinuous segments.

7. The apparatus of claim 6 wherein said drive cam means comprises a drive cam disk and a continuous drive cam track defined on a face of said drive cam disk.

8. The apparatus of claim 1 further comprising a housing in which a first of said cam means is slideably mounted over a shaft axis and the other of said cam means is relatively unslideable over said axis relative to said housing.

9. The apparatus of claim 8 further comprising compression springs and axially preloading external adjusting screws which compress said springs between an inner wall of said housing and a backface of one of said cam means.

10. The apparatus of claim 9 wherein said driven cam means comprises a driven cam disk and a driven cam track defined on a face of said driven cam disk, wherein said drive cam means comprises a drive cam disk and a drive cam track defined on a face of said drive cam disk, and wherein said backface is a backface of one of said cam disks.

11. The apparatus of claim 1 wherein said track means comprise a drive cam track and driven cam track, respectively, each having an angled flank for one-point interaction with said interacting elements.

12. The apparatus of claim 1 wherein said cam means together comprise a conjugate pair of devices translating about a common axis, a first device of said pair being an input device for supply of angular velocity and rotary motive force and a second device of said pair being an oscillating output device having at least one finite-segment cam track on a face thereof, said means for retaining and said interacting elements being for transmitting angular velocity and rotary motive force of said input device to angular velocity and rotary motive force of said output device as said interacting elements are put in motion by said input device, and said input device cooperating with said in-motion interacting elements and said output device for transmitting, through substantially all said in-motion interacting elements, said angular velocity and rotary motive force of said input device to angular velocity and rotary motive force of said oscillating output device.

13. The apparatus of claim 12 wherein said transmitting through all said in-motion interacting elements is done substantially equally and simultaneously through all said in-motion interacting elements.

14. The apparatus of claim 3 wherein said drive cam track comprises a single continuous track of segments, each said segment having its own profile.

15. The apparatus of claim 14 wherein ones of said segments have the same profile.

16. The apparatus of claim 15 wherein ones of said segments have a uniform radius for defining a respective dwell period.

17. The apparatus of claim 15 wherein ones of said segments have a non-uniform radius for defining a respective oscillation period.

18. Method for converting a rotary motion input to an oscillatory motion output, concentrically to a common axis, comprising the steps of providing a discontinuous cam track on a driven cam and locating said cam track on said axis, providing means for retaining having at least one slot extending radially to said axis, and loading at least one interacting element for retention in said radial slot, and concentrically providing a drive cam having a cam track for driving said discontinuous driven cam track via said at least one interacting element traveling in said radial slot, said traveling element driving said driven cam track into oscillating motion.

19. The method of claim 18 wherein said drive cam track segments for a continuous cam track and ones of said track segments have a constant radii, further comprising the step of providing at least one dwell period via one of said constant radii segments.

20. The method of claim 19 further comprising the step of indexing said dwell period.

* * * * *

UNITED STATES PATENT AND TRADEMARK OFFICE
CERTIFICATE OF CORRECTION

PATENT NO. : 5,321,988

DATED : June 21, 1994

INVENTOR(S) : Frank A. Folino

It is certified that error appears in the above-identified patent and that said Letters Patent is hereby corrected as shown below:

Col 1, line 25, "Where" should read --where--. Col 3, line 59, "ill" should read --in--. Col 4, lines 63 and 64, "505v/1, 505v/2, 505v/3, and 505v4" should read --505V1, 505V2, 505V3, and 505V4--; line 65, "505vF" and "505vR" should read --507VF-- and --507VR--, respectively. Col. 5, line 1, "505v/1" should read --505V1--; lines 2 and 21, "505vF" should read --507VF--; lines 10 and 23, "505vR" should read --507VR--; line 28, "$\Delta_1$ plus $\Delta_2$" should read --$\alpha_1$ plus $\alpha_2$--. Col 6, line 37, "528" should read --508--; line 37, "529" should read --509--.

Signed and Sealed this

First Day of October, 1996

Attest:

BRUCE LEHMAN

Attesting Officer

Commissioner of Patents and Trademarks